(12) United States Patent
Kim

(10) Patent No.: US 9,068,647 B2
(45) Date of Patent: Jun. 30, 2015

(54) GEAR WHEEL AND METHOD FOR MANUFACTURING GEAR WHEEL

(75) Inventor: Hyung-Jun Kim, Incheon (KR)

(73) Assignee: KWANGDUCK A & T, Incheon (KR)

( * ) Notice: Subject to any disclaimer, the term of this patent is extended or adjusted under 35 U.S.C. 154(b) by 0 days.

(21) Appl. No.: 14/000,235

(22) PCT Filed: Jan. 31, 2012

(86) PCT No.: PCT/KR2012/000723
§ 371 (c)(1),
(2), (4) Date: Sep. 24, 2013

(87) PCT Pub. No.: WO2012/111925
PCT Pub. Date: Aug. 23, 2012

(65) Prior Publication Data
US 2014/0007724 A1 Jan. 9, 2014

(30) Foreign Application Priority Data
Feb. 18, 2011 (KR) .......................... 10-2011-0014559

(51) Int. Cl.
*B32B 37/00* (2006.01)
*F16H 55/17* (2006.01)
*B29C 45/14* (2006.01)
(Continued)

(52) U.S. Cl.
CPC ............. *F16H 55/17* (2013.01); *Y10T 74/1987* (2015.01); *B29C 45/14* (2013.01); *F16H 55/06* (2013.01); *B23P 15/14* (2013.01); *B29C 70/84* (2013.01); *B29C 45/14467* (2013.01); *B29C 33/0066* (2013.01); *B29C 45/0046* (2013.01); *B29C 45/14491* (2013.01); *B29C 45/1459* (2013.01); *B29D 15/00* (2013.01); *F16H 2055/065* (2013.01)

(58) Field of Classification Search
CPC .. B29C 70/84; B29C 45/14; B29C 45/14467; B29C 45/14491; B29C 45/0046; B29C 45/1459; B23P 15/14; F16H 55/06; F16H 2055/065; B29D 15/00
USPC .............................. 264/261–263; 74/434, 439
See application file for complete search history.

(56) References Cited

U.S. PATENT DOCUMENTS

| 5,722,295 A | 3/1998 | Sakai et al. | |
| 2004/0241276 A1* | 12/2004 | Miyasaka | ..................... 425/543 |
| 2010/0201030 A1* | 8/2010 | Oberle | ........................ 264/262 |

FOREIGN PATENT DOCUMENTS

| EP | 1777439 A1 | 4/2007 | |
| EP | 2230071 A1 * | 9/2010 | ............. B29D 15/00 |

(Continued)

*Primary Examiner* — Yogendra Gupta
*Assistant Examiner* — Ninh Le
(74) *Attorney, Agent, or Firm* — Revolution IP, PLLC

(57) ABSTRACT

Provided is a method for manufacturing a gear wheel, the method including: preparing an insertion unit formed of a steel material having a hollow pipe shape; injection-molding an outer side unit including teeth on an outer circumference; and molding a connection unit having a wheel shape by injecting resin into at least three points between the insertion unit and the outer side unit so as to connect the insertion unit and the outer side unit after arranging the insertion unit on the inner center of the outer side unit. According to the method, removing of an unnecessarily injected portion may be omitted since the resin is injected between the insertion unit and the outer side unit while injection-molding the connection unit. Also, productivity is increased by decreasing a number of defective products generated due to cracks.

4 Claims, 3 Drawing Sheets

(51) Int. Cl.
*F16H 55/06* (2006.01)
*B23P 15/14* (2006.01)
*B29C 70/84* (2006.01)
*B29C 45/00* (2006.01)
*B29D 15/00* (2006.01)
*B29C 33/00* (2006.01)

(56) References Cited

FOREIGN PATENT DOCUMENTS

| KR | 10-0225001 B1 | 10/1999 |
| KR | 20-0422458 Y1 | 7/2006 |

* cited by examiner

_US 9,068,647 B2_

GEAR WHEEL AND METHOD FOR MANUFACTURING GEAR WHEEL

CROSS REFERENCE TO PRIOR APPLICATIONS

This application is a National Stage Application of PCT International Patent Application No. PCT/KR2012/000723 filed on Jan. 31, 2012, under 35 U.S.C. §371, which claims priority to Korean Patent Application No. 10-2011-0014559 filed on Feb. 18, 2011, which are all hereby incorporated by reference in their entirety.

TECHNICAL FIELD

The present invention relates to a gear wheel and a method for manufacturing the gear wheel, and more particularly, to a gear wheel and a method for manufacturing the gear wheel, wherein a stress generated while molding an outer side unit is reduced and a number of processes is reduced.

BACKGROUND ART

Generally, a gear wheel includes an outer side unit having a gear rim in a sawteeth shape outside, a hub having two opened sides and disposed coaxially to a center of the outer side unit, and a wall formed between the outer side unit and the hub or a connection unit having a connection bridge shape formed a radial direction.

Here, in order to form the connection unit, the opened sides of the hub are blocked, a flow hole is arranged at a top of a center of the hub, and then resin is injected in the radial direction to form the connection unit.

Then, after the connection unit is molded, resin adhered in an umbrella shape to the flow hole on top of a portion blocking the opened sides of the hub is cut, and a region where a side of the hub and the connection unit contact each other is processed to complete the gear wheel.

Such a gear wheel is disclosed in EP 1777439, and thus details thereof are omitted herein.

However, according to the gear wheel, since the resin is adhered in the umbrella shape to the flow hole while molding the connection unit, such resin needs to be removed separately after the connection unit is molded. Accordingly, a number of processes increases and thus a manufacturing time is increased.

DETAILED DESCRIPTION OF THE INVENTION

Technical Problem

The present invention provides a gear wheel used in an automobile steering wheel, and a method for manufacturing the gear wheel, wherein a force in an axial direction and a force in a radial direction, which are externally applied, are efficiently endured, and at the same time, manufacturing processes are simplified and a defective product is prevented from being generated, thereby increasing productivity.

Technical Solution

According to an aspect of the present invention, there is provided a method for manufacturing a gear wheel, the method including: preparing an insertion unit formed of a steel material having a hollow pipe shape; injection-molding an outer side unit having teeth on an outer circumference; and molding a connection unit having a wheel shape by injecting resin into at least three points between the insertion unit and the outer side unit so as to connect the insertion unit and the outer side unit and arrange the insertion unit at an inner center of the outer side unit.

The injection-molding of the outer side unit may include forming a plurality of protruding pieces along a circumferential direction on an inner circumference of the outer side unit so as to increase a contact area with the connection unit. The molding of the connection unit may include injecting the resin in same angles and same distances from a center of the connection unit. The insertion unit may include: a pair of coupling grooves sunken inward from a circumferential direction along two ends of the outer circumference; and a plurality of coupling protrusions protruding from the outer circumference to connect the pair of coupling grooves in a vertical direction, and sunken inward in an arc shape along the vertical direction.

According to another aspect of the present invention, there is provided a gear wheel including: an insertion unit formed of a steel material having a hollow pipe shape; an outer side unit spaced apart from outside the insertion unit and having teeth on an outer circumference; and a connection unit formed between the insertion unit and the outer side unit to couple the insertion unit and the outer side unit, wherein the insertion unit may include: a pair of coupling grooves sunken inward from a circumferential direction along two ends of the outer circumference; and a plurality of coupling protrusions protruding from the outer circumference to connect the pair of coupling grooves in a vertical direction, and sunken inward in an arc shape along the vertical direction.

Advantageous Effects

According to a method for manufacturing a gear wheel of the present invention, removing of an unnecessarily injected portion may be omitted since resin is injected between an insertion unit and an outer side unit while injection-molding a connection unit, and accordingly, productivity is increased.

BEST MODE

Hereinafter, the present invention will be described more fully with reference to the accompanying drawings, in which exemplary embodiments of the invention are shown. Terms used herein shall not be limitedly construed as general or dictionary meanings, but shall be construed as meanings and concepts suitable to technical aspects of the present invention based on the principle that the inventor can suitably define the terms to describe the invention best way possible.

Figure 1:
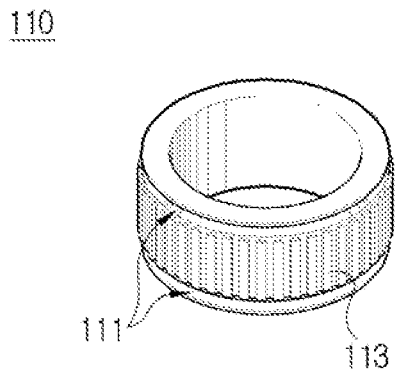
FIG. 1 is a perspective view illustrating an insertion unit of a gear wheel, according to an embodiment of the present invention.
Figure 2:
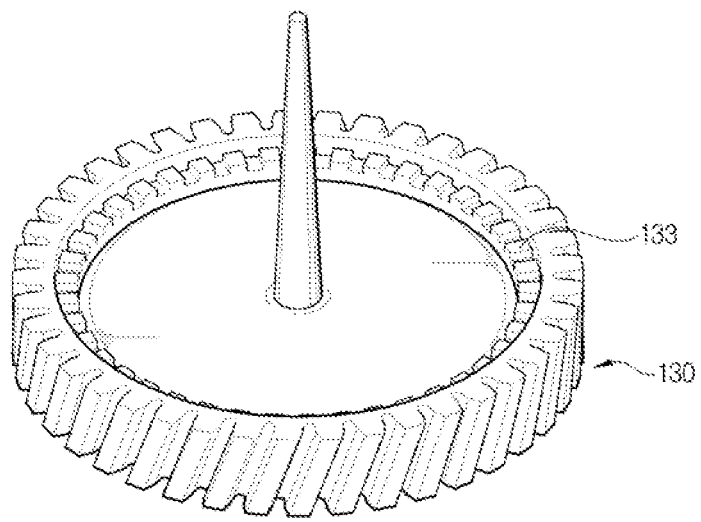
FIGS. 2 and 3 are views for describing molding of an outer side unit of the gear wheel, according to an embodiment of the present invention.
Figure 3:
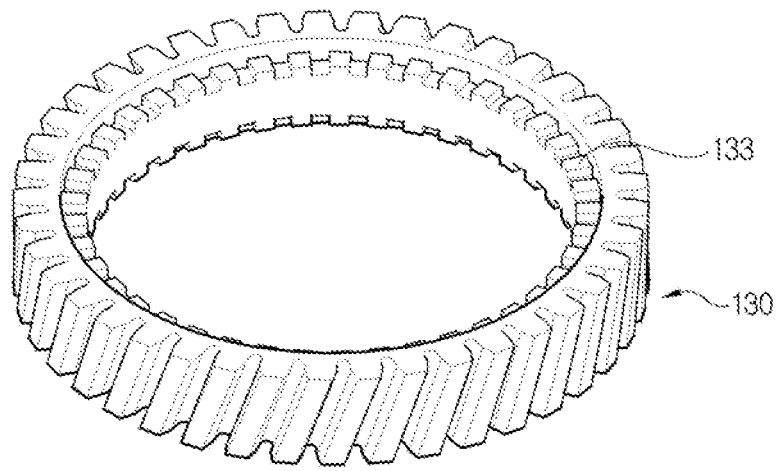
Figure 4:
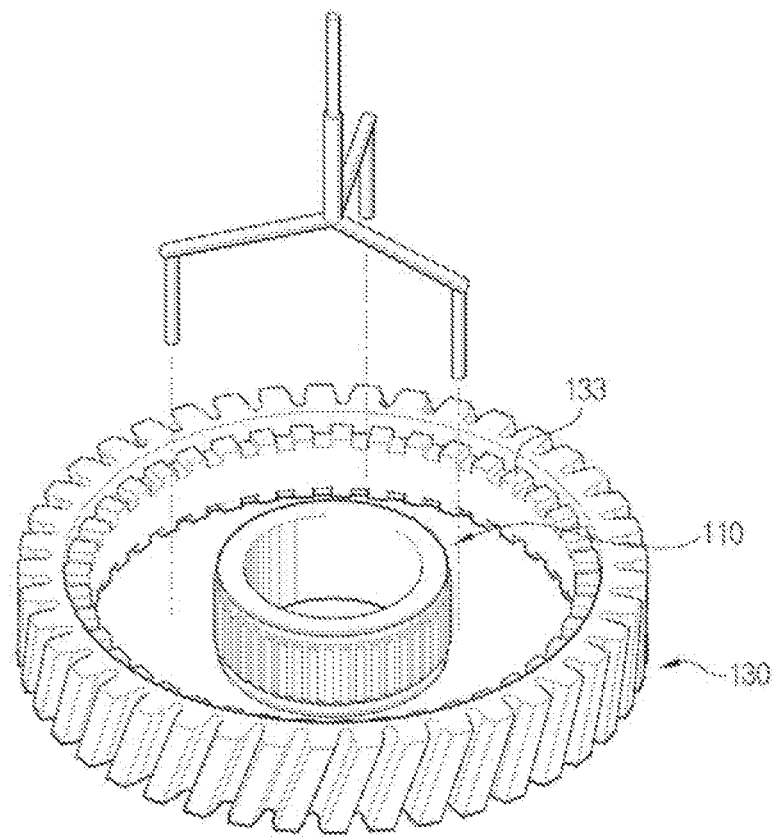
FIG. 4 is a perspective view for describing molding of a connection unit between the insertion unit and the outer side unit of FIGS. 1 through 3.
Figure 5:
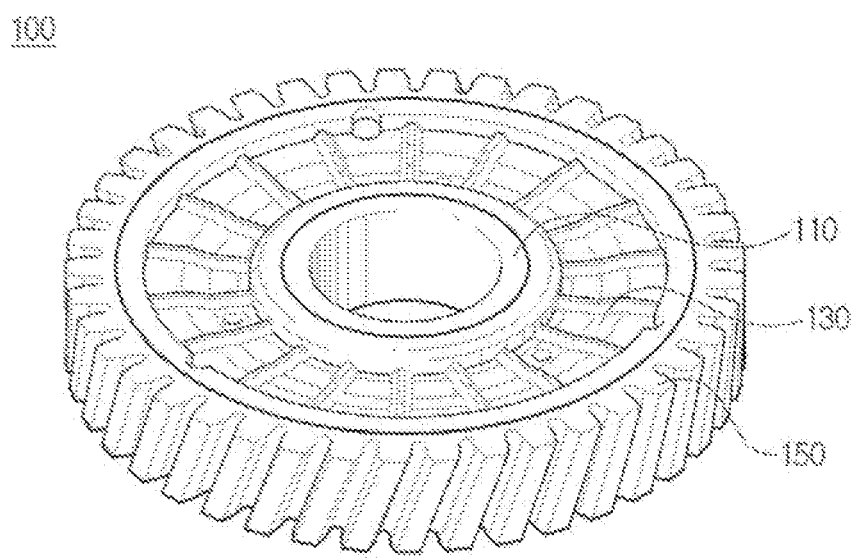
FIG. 5 is a perspective view of the gear wheel manufactured after the molding of FIG. 4.
Figure 6:
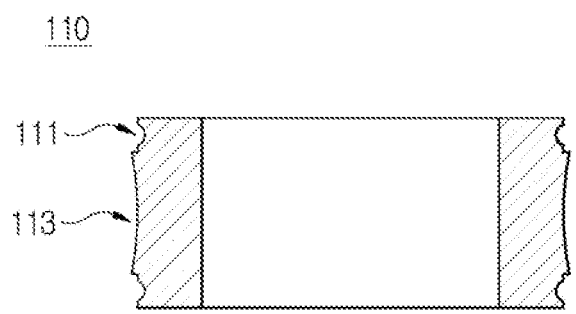
FIG. 6 is a lateral cross-sectional view of the insertion unit of FIG. 1.

FIG. 1 is a perspective view illustrating an insertion unit 110 of a gear wheel 100, according to an embodiment of the present invention, FIGS. 2 and 3 are views for describing molding of an outer side unit 130 of the gear wheel 100, according to an embodiment of the present invention, FIG. 4 is a perspective view for describing molding of a connection unit 150 between the insertion unit 110 and the outer side unit 130 of FIGS. 1 through 3, FIG. 5 is a perspective view of the gear wheel 100 manufactured after the molding of FIG. 4, and FIG. 6 is a lateral cross-sectional view of the insertion unit 110 of FIG. 1.

Referring to FIGS. 1 through 6, the gear wheel 100 includes the insertion unit 110 disposed at a center of the gear wheel 100, the connection unit 150 formed outside the insertion unit 110, and the outer side unit 130 formed outside the connection unit 150.

The insertion unit 110 has a hollow pipe shape. A pair of coupling grooves 111 sunken inward in a circumferential direction along two ends of the insertion unit 110 are formed on an outer circumference of the insertion unit 110. The insertion unit 110 connects the pair of coupling grooves 111 in a vertical direction, protrudes from the outer circumference, and includes a plurality of coupling protrusions 113 sunken in an arc shape inward from the insertion unit 110 along the vertical direction.

Accordingly, the coupling grooves 111 and the coupling protrusions 113 increase a contact area of the insertion unit 110 and the connection unit 150, and prevent the insertion unit 110 from deviating from the connection unit 150. Also a rotating force generated from the insertion unit 110 enables the connection unit 150 not to slip from the coupling protrusions 113.

Also, since the insertion unit 110 includes the pair of coupling grooves 111 sunken inward in the circumferential direction along the two ends of the outer circumference, and the plurality of coupling protrusions 113 protruding from the outer circumference to connect the coupling grooves 111 in the vertical direction and sunken in the arc shape inward along the vertical direction, an angled corner is not formed at a side, and thus a defective product may not be generated by a crack during a thermal deterioration test performed after the insertion unit 110 is completed.

Here, the outer side unit 130 is injection-molded by pressing resin. Then, a portion molded at a center of the outer side unit 130 is removed to complete the molding of the outer side unit 130.

Teeth are formed on the outer circumference of the outer side unit 130, like a spur gear or a helical gear. The outer side unit 130 may be molded by using reinforced plastic having excellent rigidity compared to the connection unit 150. Also, a plurality of protruding pieces 133 are formed on an inner circumference of the outer side unit 130 so as to increase a contact area between the outer side unit 130 and the connection unit 150, thereby increasing a coupling force between the connection unit 150 and the outer side unit 130.

The connection unit 150 is molded by arranging the insertion unit 110 at the center of the connection unit 150, arranging the outer side unit 130 to be spaced apart from outside the insertion unit 110 at regular intervals, and injecting resin between the insertion unit 110 and the outer side unit 130. Here, the resin is injected into at least three points, wherein the three points are disposed in same angles and same distances from the center of the connection unit 150.

When the resin is pressed and injected, the resin is injected into the at least three points in the same angles and same distances from a center of the three points so that the resin is uniformly distributed by an injection pressure applied for molding of the connection unit 150 and a stress occurred by deviation of the injection pressure is reduced, thereby reducing a defect rate.

A method for manufacturing the gear wheel 100 will now be described in detail.

Figure 7:
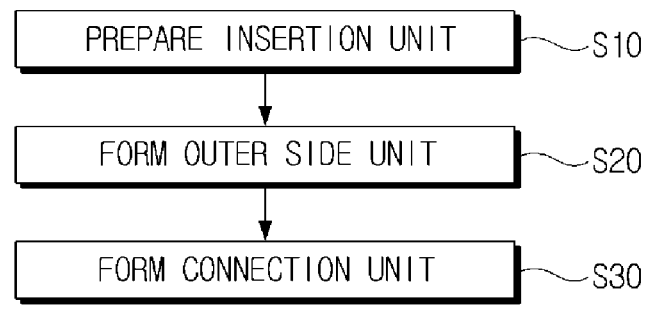
FIG. 7 is a flowchart illustrating a method for manufacturing the gear wheel of FIG. 5.

FIG. 7 is a flowchart illustrating a method for manufacturing the gear wheel 100 of FIG. 5. Referring to FIGS. 1 through 7, the method includes preparing the insertion unit 110 (operation S10), molding the outer side unit 130 (operation S20), and molding the connection unit 150 (operation S30).

In operation S10, the insertion unit 110 having the hollow pipe shape formed of the steel material is prepared.

Here, the insertion unit 110 may include the pair of coupling grooves 111 sunken inward in the circumferential direction along the two ends of the outer circumference of the insertion unit 110 so as to prevent the insertion unit 110 from deviating from the connection unit 150 and increase a frictional force.

Also, the plurality of coupling protrusions 113 protruding from the outer circumference are formed to connect the pair of coupling grooves 111 in the vertical direction. Accordingly, the insertion unit 110 is prevented from deviating or slipping from the inner circumference of the connection unit 150 in a vertical or horizontal direction.

In operation S20, the outer side unit 130 is molded to include the teeth formed on the outer circumference of the outer side unit 130 so as to be engaged to another gear. Also, the plurality of protruding pieces 133 are formed on the inner circumference of the outer side unit 130 so as to increase the contact area between the outer side unit 130 and the connection unit 150.

In operation S30, the connection unit 150 is molded by arranging the insertion unit 110 at the center of the connection unit 150, arranging the outer side unit 130 outside the connection unit 150 to be spaced apart from the insertion unit 110 at regular intervals, and injecting the resin at three points in the same angles and distances from the center of the insertion unit 110. Accordingly, the connection unit 150 is coupled to the outside of the insertion unit 110 and the inside of the outer side unit 130 to form the gear wheel 100.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of manufacturing a gear wheel for an automobile steering wheel, the method comprising:
   preparing an insertion unit formed of a steel material having a hollow pipe shape,
   wherein the insertion unit comprises
   a pair of coupling grooves sunken inward in a circumferential direction along two ends of an outer circumference of the insertion unit, and
   a plurality of coupling protrusions protruding from the outer circumference of the insertion unit and connecting the pair of coupling grooves in a vertical direction, the plurality of coupling protrusions having an arc shape sunken inward along the vertical direction,
   wherein a connection between the pair of coupling groves and the plurality of coupling protrusions does not form an angled corner;
   injection-molding an outer side unit having teeth on an outer circumference of the outer side unit; and
   molding a connection unit having a wheel shape by injecting resin into at least three different points between the insertion unit and the outer side unit so as to connect the insertion unit and the outer side unit and arrange the insertion unit at an inner center of the outer side unit, wherein said at least three different points are apart from each other at same interval of distance.

2. The method of claim 1, wherein the injection-molding of the outer side unit comprises forming a plurality of protruding pieces along a circumferential direction on an inner circumference of the outer side unit so as to increase a contact area with the connection unit.

3. The method of claim 1, wherein the molding of the connection unit comprises injecting the resin in same angles and same distances from a center of each three different point.

4. A gear wheel for an automobile steering wheel, comprising:

an insertion unit formed of a steel material having a hollow pipe shape, wherein the insertion unit comprises a pair of coupling grooves sunken inward in a circumferential direction along two ends of an outer circumference of the insertion unit, and a plurality of coupling protrusions protruding from the outer circumference of the insertion unit and connecting the pair of coupling grooves in a vertical direction, the plurality of coupling protrusions having an arc shape sunken inward along the vertical direction, wherein a connection between the pair of coupling groves and the plurality of coupling protrusions does not form an angled corner;

an outer side unit spaced apart from outside the insertion unit and having teeth on an outer circumference of the outer side unit; and a connection unit formed between the insertion unit and the outer side unit to couple the insertion unit and the outer side unit, wherein the connection unit is molded by injecting resin into at least three different points which are apart from each other at same interval of distance between the insertion unit and the outer side unit.

\* \* \* \* \*